United States Patent
Yu et al.

(10) Patent No.: US 10,934,382 B2
(45) Date of Patent: Mar. 2, 2021

(54) CONJUGATED DIENE POLYMER, FORMULATION AND MANUFACTURING METHOD THEREOF

(71) Applicant: TSRC Corporation, Kaohsiung (TW)

(72) Inventors: Juin-Meng Yu, Kaohsiung (TW); Chin-Wei Chiou, Kaohsiung (TW); Kun-Yi Chen, Kaohsiung (TW); Adel Farhan Halasa, Akron, OH (US)

(73) Assignee: TSRC Corporation, Kaohsiung (TW)

( * ) Notice: Subject to any disclaimer, the term of this patent is extended or adjusted under 35 U.S.C. 154(b) by 126 days.

(21) Appl. No.: 16/154,454

(22) Filed: Oct. 8, 2018

(65) Prior Publication Data

US 2019/0106523 A1     Apr. 11, 2019

Related U.S. Application Data

(60) Provisional application No. 62/569,341, filed on Oct. 6, 2017.

(51) Int. Cl.
| | |
|---|---|
| *C08F 236/10* | (2006.01) |
| *C08F 2/38* | (2006.01) |
| *C08K 5/1535* | (2006.01) |
| *C08K 5/1545* | (2006.01) |
| *C08K 5/06* | (2006.01) |
| *C08L 9/06* | (2006.01) |
| *C08K 5/057* | (2006.01) |
| *C08F 236/04* | (2006.01) |

(52) U.S. Cl.
CPC ............. *C08F 236/10* (2013.01); *C08F 2/38* (2013.01); *C08F 236/04* (2013.01); *C08K 5/057* (2013.01); *C08K 5/06* (2013.01); *C08K 5/1535* (2013.01); *C08K 5/1545* (2013.01); *C08L 9/06* (2013.01); *C08F 2500/01* (2013.01); *C08F 2800/20* (2013.01)

(58) Field of Classification Search
CPC .................................................. C08F 236/10
See application file for complete search history.

(56) References Cited

U.S. PATENT DOCUMENTS

| | | | |
|---|---|---|---|
| 3,294,768 A | 12/1966 | Wofford | |
| 3,787,377 A | 1/1974 | Oberster | |
| 5,916,962 A | 6/1999 | Shibata et al. | |
| 6,140,434 A | 10/2000 | Halasa et al. | |
| 6,841,648 B2 | 1/2005 | Grün et al. | |
| 6,842,648 B2 | 1/2005 | Partridge et al. | |
| 7,034,081 B2 | 4/2006 | Grun et al. | |
| 8,981,000 B2 * | 3/2015 | Hamann | ............... C08F 212/08 524/571 |
| 2010/0206443 A1 * | 8/2010 | Halasa | ................. C08F 236/10 152/209.1 |
| 2016/0222138 A1 | 8/2016 | Hamann et al. | |

FOREIGN PATENT DOCUMENTS

| | | |
|---|---|---|
| CN | 1789293 | 6/2006 |
| CN | 102344530 A | 2/2012 |
| CN | 103374101 A | 10/2013 |
| CN | 103443152 A | 12/2013 |
| CN | 103476815 | 12/2016 |
| JP | 2013-528686 A | 7/2013 |
| JP | 2014-506951 A | 3/2014 |
| JP | 2015-510959 A | 4/2015 |
| KR | 10-2012-0046721 A | 5/2012 |
| KR | 10-2014-0003584 A | 1/2014 |

OTHER PUBLICATIONS

JPO; Office Action dated Oct. 15, 2019 in Application No. 2018-189773 and English Translation thereof.
KIPO; Office Action dated Dec. 16, 2019 in corresponding Application No. 10-2018-0119186.
TIPO Examination Report in the Taiwanese Patent Application No. 107135255.
Office Action in the Taiwanese Patent Application No. 107135255.
JPO; Office Action dated Oct. 6, 2020 in Application No. 2018-189773.

* cited by examiner

*Primary Examiner* — Vu A Nguyen
(74) *Attorney, Agent, or Firm* — Snell & Wilmer L.L.P.

(57) ABSTRACT

The present invention provides a conjugated diene polymer, formulations, and manufacturing methods for the same. The present invention provides a conjugated diene polymer obtained by polymerizing conjugated diene monomers and vinyl aromatic monomers using an initiator by way of an anionic polymerization, the conjugated diene polymer comprising a plurality of blocks having more than 6 consecutive vinyl aromatic units, wherein a vinyl aromatic monomer content of the plurality of blocks having more than 6 consecutive vinyl aromatic units is less than 5 wt % based on a total vinyl aromatic monomer content of the conjugated diene polymer. The present invention also provides formulations for preparing the conjugated diene polymer and the manufacturing methods for the same.

10 Claims, No Drawings

CONJUGATED DIENE POLYMER, FORMULATION AND MANUFACTURING METHOD THEREOF

CROSS-REFERENCE TO RELATED APPLICATION

This application claims the right of priority based on U.S. Provisional Application No. 62/569,341 entitled "Conjugated Diene Polymer, Formulation and Manufacturing Method Thereof," filed on Oct. 6, 2017, which is incorporated herein by reference and assigned to the assignee herein.

BACKGROUND OF THE INVENTION

Field of the Invention

The present invention relates to a conjugated diene polymer, particularly to a conjugated diene polymer having a low amount of long vinyl aromatic blocks.

Description of the Prior Art

Solution styrene butadiene rubber (SSBR) is a conjugated diene polymer composed of butadiene monomer and styrene monomers. Industrial production of the solution styrene butadiene rubber was first proposed by the U.S. Phillips company in batch process and Firestone company in continuous process. Since the solution styrene butadiene rubber is superior to the emulsion styrene butadiene rubber in mechanical properties and rolling resistance, the solution styrene butadiene rubber is widely used by the automotive industry and in other rubber products. In order to achieve better performance of rubber materials, the industry continues to strive to improve the properties of conjugated diene polymers.

It has been reported that a high content of long styrene blocks in a conjugated diene polymer deteriorates hysteresis. To solve this problem, China Patent No. CN103476815 discloses a polymerization method comprising polymerizing butadiene and styrene monomers in the presence of an initiator, potassium alkoxide and dialkyl ether. However, the content of the long styrene block of the conjugated diene polymer formed by this method is still not low enough (the content of the styrene blocks having more than 6 consecutive styrene units is about 15 wt % to about 35 wt % of the total styrene monomer content in the polymer). U.S. Pat. No. 5,916,962 teaches the use of metal alkoxides and bicyclic ethers to produce conjugated diene polymers, the long styrene block content of which has not decreased significantly.

There is no effective and suitable method for solving the above problems in the prior art. For example, U.S. Pat. Nos. 3,294,768, 6,841,648, 7,034,081, and 6,140,434 teach the use of metal alkoxides and ethers to make conjugated diene polymers. However, each of these patents lacks an analysis relating to the content of long styrene blocks, and furthermore the long styrene block content of the conjugated diene polymer obtained according to the teachings is not satisfactory. U.S. Pat. No. 3,787,377 also teaches the use of metal alkoxides and ethers in a continuous process (non-batch) to form conjugated diene polymers having very low block contents. However, the equipment of the continuous process is complicated, and the continuous process requires high temperature reaction, which is quite disadvantageous for practical industrial production. Therefore, it is desirable to propose a novel and innovative method to form a conjugated diene polymer as needed.

SUMMARY OF THE INVENTION

In view of the above, the present invention provides conjugated diene polymers having long vinyl aromatic blocks in an amount less than those from the prior arts. The present conjugated diene polymers are prepared by a simple method with high feasibility. More specifically, even in the case where a conjugated diene polymer has a large amount of total styrene monomers, which is easy to form a long styrene block, the present invention can still provide the conjugated diene polymers having a small amount of long styrene blocks.

One aspect of the present invention is to provide a conjugated diene polymer obtained by polymerizing a conjugated diene monomer and a vinyl aromatic monomer using an initiator via anionic polymerization, the conjugated diene polymer comprising a plurality of blocks having more than six consecutive vinyl aromatic units, wherein a vinyl aromatic monomer content of the plurality of blocks having more than 6 consecutive vinyl aromatic units is less than 5 wt % based on a total vinyl aromatic monomer content of the conjugated diene polymer.

Another aspect of the present invention is to provide a formulation for preparing a conjugated diene polymer by way of polymerizing a conjugated diene monomer and a vinyl aromatic monomer using an initiator via anionic polymerization, wherein the formulation comprises the initiator, the conjugated diene monomer, the vinyl aromatic monomer, at least one kind of monocyclic ether, and at least one kind of acyclic metal alkoxide.

Still another aspect of the present invention is to provide method for preparing a conjugated diene polymer using the formulation as above, comprising: (a) adding the conjugated diene monomer, the vinyl aromatic monomer, the monocyclic ether and the acyclic metal alkoxide to a reactor containing a solvent; (b) adding the initiator to the reactor to carry out a polymerization reaction; and (c) adding an alcohol as a terminator of the polymerization reaction.

DETAILED DESCRIPTION OF THE EMBODIMENTS

The preferred embodiments of the present invention are exemplified below in order to make the invention and the scope of the claims to be fully understood. To avoid obscuring the content of the present invention, the following description may omit conventional components, related materials, and related processing techniques.

Analysis Method

The total conjugated diene monomer content of the conjugated diene polymer, the total vinyl aromatic monomer content of the conjugated diene polymer, and the vinyl structure content based on the total conjugated diene monomer content of the conjugated diene polymer (Vinyl %, Vinyl in Bond Diene) are measured referring to the relevant measurement methods described in China patent No. CN103476815, wherein NMR is Bruker AV-500 (500 MHz), the probe is a 5 mm double probe equipped with automatic frequency tuning device, the NMR operation software is TOPSPIN, and the solvent used is deuterated chloroform/tetramethylsilane ($CDCl_3$/TMS).

The glass transition temperature of the polymer and the difference between the initial glass transition temperature and the end glass transition temperature are measured with a differential scanning calorimeter (DSC), wherein TA Instrument Q200 DSC is used under nitrogen atmosphere, and the scanning rate is 20° C./min and the scanning range is −90° C. to 100° C.

The weight average molecular weight and molecular weight distribution of the polymer are measured with Gel Permeation Chromatography (GPC), wherein the pump is Waters 1525 Binary HPLC Pump, the detector is Waters 2414 Refractive Index Detector, the eluent is tetrahydrofuran, and the eluent flow rate is 1 ml/min.

The vinyl aromatic monomer content of the plurality of blocks having more than six consecutive vinyl aromatic units is measured referring to the relevant measurement methods described in China patent No. CN103476815, wherein the vinyl aromatic monomer is exemplified by styrene, and the deuterated chloroform/tetramethylsilane (CDCl$_3$/TMS) is used as a solvent and the analysis is by $^1$H-NMR spectroscopy. The characteristic peak area between 6.0 ppm and 6.7 ppm represents the styrene monomer content of the plurality of blocks having more than six (excluding six) consecutive styrene units.

The vinyl aromatic monomer content of the plurality of blocks having four to six consecutive vinyl aromatic units is measured referring to the relevant measurement methods described in China patent No. CN103476815, wherein the vinyl aromatic monomer is exemplified by styrene, and the deuterated chloroform/tetramethylsilane(CDCl$_3$/TMS) is used as a solvent and the analysis is by $^1$H-NMR spectroscopy. The characteristic peak area between 6.7 ppm and 6.9 ppm represents the styrene monomer content of the plurality of blocks having four to six (including four, five, and six) consecutive styrene units.

The vinyl aromatic monomer content of the plurality of blocks having less than four consecutive vinyl aromatic units is measured referring to the relevant measurement methods described in China patent No. CN103476815, wherein the vinyl aromatic monomer is exemplified by styrene, and the deuterated chloroform/tetramethylsilane (CDCl$_3$/TMS) is used as a solvent and the analysis is by $^1$H-NMR spectroscopy. The characteristic peak area between 6.9 ppm and 7.4 ppm represents the styrene monomer content of the plurality of blocks having less than four (excluding four) consecutive styrene units.

The vinyl aromatic monomer content of the plurality of blocks having four or more than four consecutive vinyl aromatic units is calculated by subtracting the vinyl aromatic monomer content of the plurality of blocks having less than four consecutive vinyl aromatic units from the total vinyl aromatic monomer content of the conjugated diene polymer.

The vinyl aromatic monomer content of the plurality of blocks having six or less than six consecutive vinyl aromatic units is calculated by subtracting the vinyl aromatic monomer content of the plurality of blocks having more than six consecutive vinyl aromatic units from the total vinyl aromatic monomer content of the conjugated diene polymer.

Monomer conversion ratio is calculated by monitoring the amount of monomer remaining in the reaction using Gas Chromatography(GC), wherein GC is the Agilent Technologies 7890B GC System with a split ratio of 50:1, the detector is a Flame Ionization Detector(FID) with a detector temperature of 250° C., an injection port temperature of 250° C., and a capillary column of Agilent 19091A-115.

The formulation for Preparing the Conjugated Diene Polymer

The present invention provides a formulation for preparing a conjugated diene polymer. The conjugated diene polymer is obtained by polymerizing a conjugated diene monomer and a vinyl aromatic monomer using an initiator via anionic polymerization. The formulation comprises the initiator, the conjugated diene monomer, the vinyl aromatic monomer, at least one monocyclic ether, and at least one acyclic metal alkoxide.

The anionic polymerization refers to the formation of an activated carbon anion by using an initiator, and after the monomer is added, an addition polymerization reaction with the activated carbon anion is carried out to form a polymer having a negative charge at a chain end group, and then a terminator is added to terminate the reaction and thus obtain the polymer. The organoalkali metal compound is preferred choice of the initiator, such as the organolithium compound, the organosodium compound, and the organomagnesium compound. An example of the organosodium compound is sodium naphthalene, and an example of the organomagnesium compound is dibutyl magnesium. The organolithium compound includes all organolithium compounds having a polymerization initiating ability, including the low molecular weight organolithium compound, the organolithium compound having one lithium in one molecule or a plurality of lithium in one molecule, the organolithium compound having a carbon-lithium bond, a nitrogen-lithium bond, or a tin-lithium bond at the bond connecting the organic group and lithium. Specific examples include n-propyllithium, isopropyllithium, n-butyllithium, sec-butyllithium, tert-butyllithium, n-pentyllithium, n-hexyllithium, phenyllithium, tolyllithium and all isomers thereof, benzyllithium, lithium naphthalene and lithium stilbene, etc. The multifunctional organolithium compound is, for example, 1,4-dilithium butane, the reaction product of sec-butyllithium with diisopropenylbenzene, 1,3,5-trilithium benzene, the reaction product of n-butyllithium with 1,3-butadiene and divinylbenzene, and the reaction product of n-butyllithium and a polyacetylene compound; the compound having a nitrogen-lithium bond, such as lithium dimethylamide, lithium dihexylamide, lithium diisopropylamide, and lithium hexamethyleneimine. Among those described above, n-butyllithium and sec-butyllithium are preferred. The conjugated diene monomer, for example, is independently selected from the group consisting of 1,3-butadiene, 1,3 pentadiene, 1,3-hexadiene, 1,3-heptadiene, 3-methyl-1,3-pentadiene, 3-butyl-1,3-octadiene, 2-chloro-1,3-butadiene, 2,3-dimethyl-1,3-butadiene, isoprene, 1-methylbutadiene, 2-phenyl-1,3-butadiene, and any combination thereof. Among those described above, 1,3-butadiene is preferably used. The vinyl aromatic monomer, for example, can be independently selected from the group consisting of styrene, methylstyrene and all isomers thereof, ethylstyrene and all isomers thereof, tert-butylstyrene and all isomers thereof, cyclohexylstyrene, vinylbiphenyl, 1-vinyl-5-hexylnaphthalene, vinylnaphthalene, vinylanthracene, 2,4-dimethylstyrene, 2,4-diisopropylstyrene, 5-tert-butyl-2-methylstyrene, divinylbenzene, trivinylbenzene, divinylnaphthalene, tert-butoxystyrene, N-(4-vinylbenzyl)-N,N-dimethylamine, 4-vinylbenzyl 2-(dimethylamino)ethyl ether, N,N-dimethylaminoethylstyrene, N,N-dimethylaminomethylstyrene, vinylpyridine, diphenylethylene, diphenylethylene containing tertiary amino groups, such as 1-(4-N,N-dimethylaminophenyl)-1-phenylethylene, and any combinations thereof.

Among those described above, styrene is preferably used. It is a common choice to use 1,3-butadiene, isoprene or 2,3-dimethyl-1,3-butadiene as the conjugated diene monomer and to use styrene as the vinyl aromatic monomer.

The monocyclic ether is preferably selected from tetrahydrofuran (THF), oxole, tetrahydropyran (THP), 2-methyl-tetrahydropyran, 3-methyl-tetrahydropyran, crown ethers such as 12-crown-4 ether, 15-crown-5 ether or 18-crown-6 ether, or dioxane (also known as 1,4-dioxane), etc. The molar ratio of the monocyclic ether to the effective initiator is preferably from 5 to 500, more preferably from 10 to 400, or particularly preferably from 65 to 300. The acyclic metal alkoxide is preferably selected from potassium 3,7-dimethyl-3-octylate (KDMO), potassium tert-amylate (K-Amylate), and sodium tert-amylate (Na-Amylate), potassium tert-butoxide, or sodium tert-butoxide, etc. In the preferred embodiments where the acyclic metal alkoxide is used in combination of the monocyclic ether, the molar ratio of the acyclic metal alkoxide to the effective initiator is preferably from 0.16 to 10, more preferably from 0.2 to 7, or particularly preferably from 0.3 to 5. The term "effective initiator" in the present invention is defined as the ratio of the initiator which reacts with the monomer. The mole of the effective initiator is calculated by dividing the total amount of monomers with the initial molecular weight of the polymer wherein the initial molecular weight is analyzed by gel permeation chromatography (GPC).

In addition to the above monocyclic ethers and acyclic metal alkoxides, linear ethers or bicyclic ethers may be added as needed. The linear ether is preferably selected from dialkylethers, such as diethylether, di-n-propylether, di-n-butylether, ethylene glycol di-n-butyl ether, ethylene glycol diethyl ether, ethylene glycol dimethyl ether, ethylene glycol dibutyl ether, diethylene glycol diethyl ether, diethylene glycol dimethyl ether, diethylene glycol dibutyl ether, diethylene glycol diethyl ether, diethylene glycol dimethyl ether, methyl-n-propylether, diisopropyl ether, tert-amylethylether, methyl-tert-butylether (MTBE), or ethyl-tert-butylether (ETBE). The molar ratio of the linear ether to the effective initiator is preferably from 0.1 to 100, more preferably from 1.0 to 80, or particularly preferably from 5.0 to 60. The bicyclic ether may preferably be 2,2-di(2-tetrahydrofuryl)propane (DTHFP), and the molar ratio of the bicyclic ether to the effective initiator is preferably from 0.001 to 30, more preferably from 0.005 to 20, or particularly preferably from 0.01 to 10. The molar ratio of the sum of the monocyclic ether and the linear ether to the effective initiator is preferably from 5 to 500, more preferably from 10 to 400, particularly preferably from 20 to 300. The molar ratio of the sum of the monocyclic ether and the bicyclic ether to the effective initiator is preferably from 5 to 500, more preferably from 10 to 400, particularly preferably from 20 to 300. In the preferred embodiments where the acyclic metal alkoxide and the monocyclic ether are used in combination of the linear ether or the bicyclic ether, the molar ratio of the acyclic metal alkoxide to the effective initiator is preferably from 0.001 to 10, more preferably from 0.01 to 7, or particularly preferably from 0.05 to 5.

Method for Preparing a Conjugated Diene Polymer

The present invention provides a method for preparing a conjugated diene polymer using the formulation described above. The method comprises: (a) adding the conjugated diene monomer, the vinyl aromatic monomer, the monocyclic ether and the acyclic metal alkoxide to a reactor containing a solvent; (b) adding the initiator to the reactor to carry out a polymerization reaction; and (c) adding an alcohol as a terminator of the polymerization reaction. The temperature of the polymerization reaction in step (b) is preferably lower than 110° C. The method of the present invention preferably uses the adiabatic batch process.

With regard to step (a), a suitable solvent is, for example, an inert organic solvent, which does not participate in the polymerization reaction. Such solvent comprises the aliphatic hydrocarbons, like butane, isobutane, n-pentane, isopentane, 2,2,4-trimethylpentane, isohexane, n-hexane, isoheptane, n-heptane, isooctane, or n-octane; or cycloalkanes, like cyclohexane, methylcyclohexane, ethylcyclohexane, cyclopentane, cycloheptane, or methylcyclopentane; or aromatic hydrocarbons, like benzene, toluene, xylene, ethylbenzene, diethylbenzene, or propylbenzene. What is suitable for use in the present invention is preferably cyclohexane.

With regard to step (b), initial temperature of the polymerization is preferably from 10° C. to 80° C., and the final temperature is preferably from 30° C. to 110° C. The temperature control method is preferably an adiabatic reaction method, while constant temperature control or partial cooling method may also be used.

With regard to step (c), methanol or other suitable alcohols can be used as the polymerization terminator. The conjugated diene polymer may also be modified by adding a suitable modifier, such as siloxane or the like, before the addition of the terminator. The conjugated diene polymer (modified or unmodified) completed as described above may be removed of solvent by using steam, electric heat, hot air or the like as needed and then dried by the well-known drying method.

Properties of Conjugated Diene Polymers

In accordance with various embodiments of the present invention, the weight average molecular weight of the conjugated diene polymer is preferably from 150,000 to 1.2 million, more preferably from 200,000 to 1.1 million, or particularly preferable from 260,000 to 1 million. The molecular weight distribution (MWD) of the conjugated diene polymer is preferably from 1.0 to 1.5, more preferably from 1.0 to 1.3, or particularly preferably from 1.0 to 1.2.

In accordance with various embodiments of the present invention, the conjugated diene polymer comprises a plurality of blocks having more than six consecutive vinyl aromatic units, wherein a vinyl aromatic monomer content of the plurality of blocks having more than six consecutive vinyl aromatic units is less than 5 wt % based on a total vinyl aromatic monomer content of the conjugated diene polymer.

In accordance with various embodiments of the present invention, the conjugated diene polymer comprises a plurality of blocks having four or more than four consecutive vinyl aromatic units, and a vinyl aromatic monomer content of the plurality of blocks having four or more than four consecutive vinyl aromatic units is less than 40 wt %, more preferably less than 30 wt %, or particularly preferably less than 25 wt % based on a total vinyl aromatic monomer content of the conjugated diene polymer.

In accordance with various embodiments of the present invention, the conjugated diene polymer comprises a plurality of blocks having four to six consecutive vinyl aromatic units, and a vinyl aromatic monomer content of the plurality of blocks having four to six consecutive vinyl aromatic units is less than 25 wt %, more preferably less than 20 wt %, or particularly preferably less than 15 wt % based on a total vinyl aromatic monomer content of the conjugated diene polymer.

In accordance with various embodiments of the present invention, the conjugated diene polymer has an early-phased total vinyl aromatic monomer content (wt %) when a monomer conversion ratio is no more than 50% during polymerization and a late-phased total vinyl aromatic monomer content (wt %) when a monomer conversion ratio is no less than 90% during polymerization, wherein the difference between the early-phased total vinyl aromatic monomer content (wt %) and the late-phased total vinyl aromatic monomer content (wt %) is less than 20 wt %, more preferably less than 15 wt %, or particularly preferably less than 10 wt %.

In accordance with various embodiments of the present invention, the conjugated diene polymer comprises a plurality of blocks having six or less than six consecutive vinyl aromatic units, and a vinyl aromatic monomer content of the plurality of blocks having six or less than six consecutive vinyl aromatic units is 95 wt % or more based on a total vinyl aromatic monomer content of the conjugated diene polymer.

In accordance with various embodiments of the present invention, the conjugated diene polymer has an initial glass transition temperature and an end glass transition temperature, and the difference between the initial glass transition temperature and the end glass transition temperature is preferably from 5° C. to 20° C.

In accordance with various embodiments of the present invention, the total vinyl aromatic monomer content of the conjugated diene polymer is preferably from 10 wt % to 55 wt %, more preferably from 20 wt % to 50 wt %, particularly preferably from 25 wt % to 45 wt %, more particularly preferably from 30 wt % to 45 wt %, and even more particularly preferably from 35 wt % to 45 wt %. In a preferred embodiment, when the total vinyl aromatic monomer content of the conjugated diene polymer is 25 wt % or more, the conjugated diene polymer of the present invention can still reach a low amount of long vinyl aromatic blocks.

In accordance with various embodiments of the present invention, the total conjugated diene monomer content of the conjugated diene polymer is preferably from 45 wt % to 90 wt %, more preferably from 50 wt % to 80 wt %, particularly preferably from 55 wt % to 75 wt %, more particularly preferably from 55 wt % to 70 wt %, and even more particularly preferably from 55 wt % to 65 wt %.

In accordance with various embodiments of the present invention, the vinyl structure content ranges from 5 wt % to 80 wt %, based on the total conjugated diene monomer content of the conjugated diene polymer.

Example 1

1.44 kg of cyclohexane was injected into a 3 L stainless steel reactor filled with nitrogen, and then 2.31 g of tetrahydrofuran (herein referred to as THF), (monocyclic ether), 1.5 g of cyclohexane solution containing 2 wt % of potassium 3,7-dimethyl-3-octylate (herein referred to as KDMO) (acyclic metal alkoxide), 96 g of 1,3-butadiene, and 64 g of styrene were added. And the system was gradually warmed to 60° C. When the system was stabilized, 1.5 g of cyclohexane solution containing 5 wt % of n-butyl lithium was added. When the monomer conversion ratio was greater than 99%, methanol was further added as the terminator. In Example 1, the total conjugated diene (1,3-butadiene) monomer contents (wt %) and the total vinyl aromatic (styrene) monomer contents (wt %) obtained at different time points with different monomer conversion ratio during polymerization period were analyzed, as shown in Table 1. The total vinyl aromatic monomer content (wt %) measured at any time point during the period when the monomer conversion ratio is 50% or less, based on the conjugated diene polymer obtained at that time point, is referred to as "early-phased" total vinyl aromatic monomer content (wt %); and the total vinyl aromatic monomer content (wt %) measured at any time point during the period when the monomer conversion ratio is 90% or more, based on the conjugated diene polymer obtained at that time point, is referred to as "late-phased" total vinyl aromatic monomer content (wt %). In this example, the difference between the early-phased total vinyl aromatic monomer content (wt %) and the late-phased total vinyl aromatic monomer content (wt %) has the following three data, which are (36.52-32.41) wt %=4.11 wt %, (36.70-32.41) wt %=4.29 wt %, and (36.69-32.41) wt %=4.28 wt %, respectively.

TABLE 1

| Monomer conversion ratio (%) | The total conjugated diene (1,3-butadiene) monomer content (wt %) | The total vinyl aromatic (styrene) monomer content (wt %) |
| --- | --- | --- |
| 0.00 | 0.00 | 0.00 |
| 27.52 | 67.59 (early-phased) | 32.41 (early-phased) |
| 59.54 | 63.13 | 36.87 |
| 82.99 | 63.28 | 36.72 |
| 95.43 | 63.48 (late-phased) | 36.52 (late-phased) |
| 99.48 | 63.30 (late-phased) | 36.70 (late-phased) |
| 99.91 | 63.31 (late-phased) | 36.69 (late-phased) |

Example 2

The main difference between Example 2 and Example 1 is that in Example 2 ethylene glycol diethyl ether (herein referred to as EGDEE) (linear ether) was additionally added. Details are as follows: 44.4 kg of cyclohexane was injected into a 100 L stainless steel reactor filled with nitrogen, and then 8.9 g of ethylene glycol diethyl ether (linear ether), 197 g of tetrahydrofuran (monocyclic ether), 1.6 g of cyclohexane solution containing 4.9 wt % of potassium 3,7-dimethyl-3-octylate (acyclic metal alkoxide), 2.64 kg of 1,3-butadiene, and 1.76 kg of styrene were added. And the system was gradually warmed to 60° C. When the system was stabilized, 22.5 g of cyclohexane solution containing 5 wt % of n-butyl lithium was added. When the monomer conversion ratio was greater than 99%, methanol was further added as the terminator.

Example 3

The main difference between Example 3 and Example 1 is that in Example 3 2,2-di(2-tetrahydrofuryl)propane (herein referred to as DTHFP, the bicycle ether) was additionally added. Details are as follows. 2.88 kg of cyclohexane was injected into a 5 L stainless steel reactor filled with nitrogen, and then 4.61 g of tetrahydrofuran (monocyclic ether), 0.86 g of 1 wt % DTHFP, 0.91 g of cyclohexane solution containing 1 wt % of potassium 3,7-dimethyl-3-octylate (acyclic metal alkoxide), 192 g of 1,3-butadiene, and 128 g of styrene were added, and then the system was gradually warmed to 60° C. When the system was stabilized, 2 g of cyclohexane solution containing 5 wt % of n-butyl lithium was added. When the monomer conversion ratio was greater than 99%, methanol was further added as the terminator.

Example 4

The main difference between Example 4 and Example 1 is that in Example 4 sodium tert-amylate (herein referred to as Na-Amylate, the acyclic metal alkoxide) was used to replace potassium 3,7-dimethyl-3-octylate (acyclic metal alkoxide). Details are as follows. 1.44 kg of cyclohexane was injected into a 3 L stainless steel reactor filled with nitrogen, and then 2.3 g of tetrahydrofuran (monocyclic ether), 8 g of cyclohexane solution containing 0.98 wt % of sodium tert-amylate (acyclic metal alkoxide), 96 g of 1,3-butadiene, and 64 g of styrene were added, and then the system was gradually warmed to 60° C. When the system was stabilized, 3.01 g of cyclohexane solution containing 2.94 wt % of n-butyl lithium was added. When the monomer conversion ratio was greater than 99%, methanol was further added as the terminator.

Example 5

The main difference between Example 5 and Example 1 is that in Example 5 sodium tert-amylate (acyclic metal alkoxide) was used to replace potassium 3,7-dimethyl-3-octylate (acyclic metal alkoxide), and ethylene glycol diethyl ether (linear ether) was additionally added. Details are as follows. 2.83 kg of cyclohexane was injected into a 5 L stainless steel reactor filled with nitrogen, and 5.46 g of ethylene glycol diethyl ether (linear ether), 23.4 g of tetrahydrofuran (monocyclic ether), 1.5 g of cyclohexane solution containing 2.5 wt % of sodium tert-amylate (acyclic metal alkoxide), 210 g of 1,3-butadiene, and 140 g of styrene were added, and then the system was gradually warmed to 60° C. When the system was stabilized, 7.3 g of cyclohexane solution containing 5 wt % of n-butyl lithium was added. When the monomer conversion ratio was greater than 99%, methanol was further added as the terminator.

Table 2 shows various properties of the conjugated diene polymers prepared in Examples 1 to 5. Compared with Example 1, Example 2 that additionally added ethylene glycol diethyl ether (linear ether) also obtains a conjugated diene polymer in which a vinyl aromatic monomer content of the plurality of blocks having more than six consecutive vinyl aromatic units is less than 5 wt %. Compared with Example 1, Example 3 that additionally added 2,2-di(2-tetrahydrofuryl)propane also obtains a conjugated diene polymer in which a vinyl aromatic monomer content of the plurality of blocks having more than six consecutive vinyl aromatic units is less than 5 wt %. Compared with Example 1, Example 4 that used sodium tert-amylate (acyclic metal alkoxide) to replace potassium 3,7-dimethyl-3-octylate (acyclic metal alkoxide) obtains a conjugated diene polymer in which a vinyl aromatic monomer content of the plurality of blocks having more than 6 consecutive vinyl aromatic units is even less. Compared to Example 2, Example 5 that used sodium tert-amylate (acyclic metal alkoxide) to replace potassium 3,7-dimethyl-3-octylate (acyclic metal alkoxide) and additionally added ethylene glycol diethyl ether (linear ether) obtains a conjugated diene polymer in which a vinyl aromatic monomer content of the plurality of blocks having more than six consecutive vinyl aromatic units is even less. The conjugated diene polymers of Examples 1 to 5 each has a total vinyl aromatic monomer content of up to 25 wt % or more, and a vinyl aromatic monomer content of the plurality of blocks having more than six consecutive vinyl aromatic units is less than 5 wt %.

TABLE 2

| Results | Example 1 KDMO/THF | Example 2 KDMO/THF/ EGDEE | Example 3 KDMO/THF/ DTHFP | Example 4 Na-Amylate/ THF | Example 5 Na-Amylate/ THF/EGDEE |
|---|---|---|---|---|---|
| KDMO/Li molar ratio | 0.45 | 0.08 | 0.07 | 0 | 0 |
| Na-Amylate/Li molar ratio | 0 | 0 | 0 | 2.25 | 0.71 |
| THF/Li molar ratio | 69.5 | 197.0 | 101.1 | 101.0 | 67.4 |
| EGDEE/Li molar ratio | 0 | 15 | 0 | 0 | 9.6 |
| DTHFP/Li molar ratio | 0 | 0 | 0.07 | 0 | 0 |
| The vinyl aromatic monomer content of a plurality of blocks having more than six consecutive vinyl aromatic units ($^1$H-NMR 6.0~6.7 ppm area ratio (n > 6)) (wt %) | 3.69 | 3.51 | 3.20 | 0.04 | 0.97 |
| The vinyl aromatic monomer content of a plurality of blocks having four to six consecutive vinyl aromatic units ($^1$H-NMR 6.7~6.9 ppm area ratio (n = 4~6)) (wt %) | 12.43 | 12.30 | 11.50 | 3.08 | 7.12 |
| The vinyl aromatic monomer content of a plurality of blocks having less than four consecutive vinyl aromatic units ($^1$H-NMR 6.9~7.4 ppm area ratio (n < 4)) (wt %) | 83.88 | 84.19 | 85.3 | 96.88 | 91.91 |
| Glass transition temperature (° C.) | −34.8 | −24.9 | −35.8 | −24.3 | −22.4 |
| Difference between the initial glass transition temperature and the end glass transition temperature (° C.) | 10.0 | 10.9 | 12.5 | 7.1 | 7.2 |

TABLE 2-continued

| Results | Example 1 KDMO/THF | Example 2 KDMO/THF/ EGDEE | Example 3 KDMO/THF/ DTHFP | Example 4 Na-Amylate/ THF | Example 5 Na-Amylate/ THF/EGDEE |
|---|---|---|---|---|---|
| Difference between the early-phased total vinyl aromatic monomer content and the late-phased total vinyl aromatic monomer content (wt %) | 4.28 | 1.33 | 7.73 | 3.08 | 3.30 |
| Total vinyl aromatic monomer content of the conjugated diene polymer (wt %) | 40.8 | 40.4 | 39.8 | 42.8 | 40.8 |
| The vinyl structure content based on the total conjugated diene monomer content of the conjugated diene polymer (wt %) | 23.7 | 39.7 | 25.2 | 34.6 | 46.6 |

Comparative Example 1

The main difference between Comparative Example 1 and Example 1 is that Comparative Example 1 didn't use tetrahydrofuran (monocyclic ether). Details are as follows. 1.44 kg of cyclohexane was injected into a 3 L stainless steel reactor filled with nitrogen, and 2.42 g of cyclohexane solution containing 2 wt % of potassium 3,7-dimethyl-3-octylate (acyclic metal alkoxide), 96 g of 1,3-butadiene, and 64 g of styrene were added, and then the system was gradually warmed to 60° C. When the system was stabilized, 2.18 g of cyclohexane solution containing 5 wt % of n-butyl lithium was added. When the monomer conversion ratio was greater than 99%, methanol was further added as the terminator.

Comparative Example 2

The main difference between Comparative Example 2 and Example 2 is that Comparative Example 2 didn't use tetrahydrofuran (monocyclic ether). Details are as follows. 1.44 kg of cyclohexane was injected into a 3 L stainless steel reactor filled with nitrogen, and 7.2 g of ethylene glycol diethyl ether (linear ether), 1.2 g of cyclohexane solution containing 2 wt % of potassium 3,7-dimethyl-3-octylate (acyclic metal alkoxide), 96 g of 1,3-butadiene, and 64 g of styrene were added, and then the system was gradually warmed to 60° C. When the system was stabilized, 1.75 g of cyclohexane solution containing 5 wt % of n-butyl lithium was added. When the monomer conversion ratio was greater than 99%, methanol was further added as the terminator.

Comparative Example 3

The main difference between Comparative Example 3 and Example 2 is that Comparative Example 3 didn't use potassium 3,7-dimethyl-3-octylate (acyclic metal alkoxide). Details are as follows. 1.44 kg of cyclohexane was injected into a 3 L stainless steel reactor filled with nitrogen, and 0.29 g of ethylene glycol diethyl ether (linear ether), 2.3 g of tetrahydrofuran (monocyclic ether), 96 g of 1,3-butadiene, and 64 g of styrene were added, and then the system was gradually warmed to 60° C. When the system was stabilized, 2.05 g of cyclohexane solution containing 5 wt % of n-butyl lithium was added. When the monomer conversion ratio was greater than 99%, methanol was further added as the terminator.

Comparative Example 4

The main difference between Comparative Example 4 and Example 1 is that Comparative Example 4 didn't use potassium 3,7-dimethyl-3-octylate (acyclic metal alkoxide). Details are as follows. 1.44 kg of cyclohexane was injected into a 3 L stainless steel reactor filled with nitrogen, and 2.4 g of tetrahydrofuran (monocyclic ether), 96 g of 1,3-butadiene, and 64 g of styrene were added, and then the system was gradually warmed to 60° C. When the system was stabilized, 2 g of cyclohexane solution containing 5 wt % of n-butyl lithium was added. When the monomer conversion ratio was greater than 99%, methanol was further added as the terminator.

Table 3 shows various properties of the conjugated diene polymers prepared in Comparative Examples 1 to 4. Comparative Examples 1 and 2 did not use tetrahydrofuran (monocyclic ethers) such that the vinyl aromatic monomer content of the plurality of blocks having more than six consecutive vinyl aromatic units fails to reduce to less than 5 wt %. Comparative Examples 3 and 4 did not use potassium 3,7-dimethyl-3-octylate (acyclic metal alkoxide), such that the vinyl aromatic monomer content of the plurality of blocks having more than six consecutive vinyl aromatic units fails to reduce to less than 5 wt %.

TABLE 3

| Results | Comparative Example 1 KDMO | Comparative Example 2 KDMO/EGDEE | Comparative Example 3 THF/EGDEE | Comparative Example 4 THF |
|---|---|---|---|---|
| KDMO/Li molar ratio | 0.47 | 0.27 | 0 | 0 |
| Na-Amylate/Li molar ratio | 0 | 0 | 0 | 0 |
| THF/Li molar ratio | 0 | 0 | 88.0 | 138.6 |
| EGDEE/Li molar ratio | 0 | 2.64 | 6.71 | 0 |

TABLE 3-continued

| Results | Comparative Example 1 KDMO | Comparative Example 2 KDMO/EGDEE | Comparative Example 3 THF/EGDEE | Comparative Example 4 THF |
|---|---|---|---|---|
| DTHFP/Li molar ratio | 0 | 0 | 0 | 0 |
| The vinyl aromatic monomer content of a plurality of blocks having more than six consecutive vinyl aromatic units (1H-NMR 6.0~6.7 ppm area ratio (n > 6)) (wt %) | 10.36 | 8.88 | 6.88 | 7.14 |
| The vinyl aromatic monomer content of a plurality of blocks having four to six consecutive vinyl aromatic units (1H-NMR 6.7~6.9 ppm area ratio (n = 4~6)) (wt %) | 14.81 | 15.97 | 3.06 | 2.82 |
| The vinyl aromatic monomer content of a plurality of blocks having less than four consecutive vinyl aromatic units (1H-NMR 6.9~7.4 ppm area ratio (n < 4)) (wt %) | 74.83 | 75.15 | 90.06 | 90.04 |
| Glass transition temperature (° C.) | −56.3 | −49.0 | −43.1 | −41.9 |
| Difference between the initial glass transition temperature and the end glass transition temperature (° C.) | 22.8 | 18.1 | 6.3 | 7.1 |
| Difference between the early-phased total vinyl aromatic monomer content and the late-phased total vinyl aromatic monomer content (wt %) | 3.07 | 5.25 | 9.81 | 17.44 |
| Total vinyl aromatic monomer content of the conjugated diene polymer (wt %) | 40.4 | 40.8 | 39.9 | 42.0 |
| The vinyl structure content based on the total conjugated diene monomer content of the conjugated diene polymer (wt %) | 11.7 | 17.3 | 27.8 | 26.4 |

Application of Conjugated Diene Polymer

The conjugated diene polymer of the present invention may be mixed with other components to obtain a rubber composition. Specific examples of the other components include natural rubber, other conjugated diene polymers different from the present invention, ethylene-propylene copolymers, and ethylene-octene copolymers. The above compositions may be a mixed application of two or more types. For the composition of the rubber composition, the content of the conjugated diene polymer is preferably at least 10 parts by weight, and more preferably at least 20 parts by weight when the total amount of all the components is 100 parts by weight.

Further, the rubber composition may also contain an additive. Specific examples of the additive include a vulcanizing agent, such as sulfur; a vulcanization accelerator, such as a thiazole-based vulcanization accelerator, a thiuram-based vulcanization accelerator, or a sulfenamide-based vulcanization accelerator; a vulcanization activator, such as stearic acid or zinc oxide; an organic peroxide; a reinforcing agent, such as a silica compound or carbon black; a filler, such as calcium carbonate or talc; a silane coupling agent; a filling oil; a processing aid; an antioxidant; and a lubricant, etc.

The mixing method of the rubber composition of the present invention can use, for example, a conventional mixer, such as a roller, a banbury mixer, or an internal mixer for kneading various components. Regarding the conditions of the mixing, in addition to the vulcanizing agent or the vulcanization accelerator, when the additive, the filler, silica compound and/or other reinforcing agents are mixed, the processing temperature is usually from 50° C. to 200° C., preferably from 80° C. to 150° C. with two to three stages of mixing and the processing time is usually 30 seconds to 20 minutes, preferably 1 minute to 10 minutes. When the vulcanizing agent or the vulcanization accelerator is mixed, the processing temperature is usually not more than 100° C., preferably from room temperature to 90° C. The composition mixed with the vulcanizing agent or the vulcanization accelerator can be prepared by a vulcanization treatment, such as press vulcanization. The temperature of the vulcanization treatment is usually from 120° C. to 200° C., preferably from 140° C. to 180° C.

The conjugated diene polymer of the present invention and the rubber composition thereof can be used for tires, soles, flooring materials, vibration blocking materials, etc., and are particularly suitable for use in tires to improve the low rolling resistance of the tire tread and to promote the wet-skid resistance, resulting in handling stability and reliability.

The above description is only the preferred embodiment of the present invention, and is not intended to limit the scope of the claims of the present invention. All other equivalent changes or modifications which are made without departing from the spirit of the present invention should be included in the scope of the following claims.

What is claimed is:

1. A conjugated diene polymer obtained by polymerizing a conjugated diene monomer and a vinyl aromatic monomer using an initiator via anionic polymerization, the conjugated diene polymer comprising a plurality of blocks having more than six consecutive vinyl aromatic units and a plurality of blocks having four to six consecutive vinyl aromatic units, wherein a vinyl aromatic monomer content of the plurality of blocks having more than six consecutive vinyl aromatic units is less than 5 wt % based on a total vinyl aromatic monomer content of the conjugated diene polymer, a vinyl aromatic monomer content of the plurality of blocks having four to six consecutive vinyl aromatic units is less than 20 wt % based on the total vinyl aromatic monomer content of the conjugated diene polymer, and the total vinyl aromatic monomer content of the conjugated diene polymer ranges from 30 wt % to 45 wt %.

2. The conjugated diene polymer of claim 1, wherein the conjugated diene polymer comprises a plurality of blocks having four or more than four consecutive vinyl aromatic units, and a vinyl aromatic monomer content of the plurality of blocks having four or more than four consecutive vinyl aromatic units is less than 25 wt %, based on the total vinyl aromatic monomer content of the conjugated diene polymer.

3. The conjugated diene polymer of claim 1, wherein the conjugated diene polymer comprises a plurality of blocks having four to six consecutive vinyl aromatic units, and a vinyl aromatic monomer content of the plurality of blocks having four to six consecutive vinyl aromatic units is less than 15 wt % based on the total vinyl aromatic monomer content of the conjugated diene polymer.

4. The conjugated diene polymer of claim 1, wherein the conjugated diene polymer has an early-phased total vinyl aromatic monomer content when a monomer conversion ratio is no more than 50% during polymerization and a late-phased total vinyl aromatic monomer content when a monomer conversion ratio is no less than 90% during polymerization, wherein the difference between the early-phased total vinyl aromatic monomer content and the late-phased total vinyl aromatic monomer content is less than 20 wt %, less than 15 wt %, or less than 10 wt %.

5. The conjugated diene polymer of claim 1, wherein the conjugated diene polymer comprises a plurality of blocks having six or less than six consecutive vinyl aromatic units, and a vinyl aromatic monomer content of the plurality of blocks having six or less than six consecutive vinyl aromatic units is 95 wt % or more based on the total vinyl aromatic monomer content of the conjugated diene polymer.

6. The conjugated diene polymer of claim 1, wherein the conjugated diene polymer has an initial glass transition temperature and an end glass transition temperature, and the difference between the initial glass transition temperature and the end glass transition temperature ranges from 5° C. to 20° C.

7. The conjugated diene polymer of claim 1, wherein the total vinyl aromatic monomer content of the conjugated diene polymer ranges from 35 wt % to 45 wt %.

8. The conjugated diene polymer of claim 1, wherein a total conjugated diene monomer content of the conjugated diene polymer ranges from 55 wt % to 70 wt %, or 55 wt % to 65 wt %.

9. The conjugated diene polymer of claim 1, wherein a vinyl structure content ranges from 5 wt % to 80 wt %, based on the total conjugated diene monomer content of the conjugated diene polymer.

10. The conjugated diene polymer of claim 1, wherein the weight average molecular weight of the conjugated diene polymer ranges from 150,000 to 1.2 million, 200,000 to 1.1 million, or 260,000 to 1 million.

* * * * *